(12) United States Patent
Orlando et al.

(10) Patent No.: US 8,499,163 B2
(45) Date of Patent: Jul. 30, 2013

(54) SERIAL ARCHITECTURE FOR HIGH ASSURANCE PROCESSING

(75) Inventors: Gerardo Orlando, Newton, MA (US); David R. King, Shrewsbury, MA (US); Mark Krumpoch, Shrewsbury, MA (US); Evan Custodio, Brighton, MA (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 545 days.

(21) Appl. No.: 12/713,409

(22) Filed: Feb. 26, 2010

(65) Prior Publication Data

US 2011/0213984 A1 Sep. 1, 2011

(51) Int. Cl.
*H04L 29/06* (2006.01)
(52) U.S. Cl.
USPC .......................................................... 713/181
(58) Field of Classification Search
None
See application file for complete search history.

(56) References Cited

U.S. PATENT DOCUMENTS

| | | | |
|---|---|---|---|
| 6,219,420 B1 | 4/2001 | Hardy et al. | |
| 6,219,791 B1 | 4/2001 | Blanchard et al. | |
| 6,754,819 B1 | 6/2004 | Wootten et al. | |
| 6,996,712 B1 | 2/2006 | Perlman et al. | |
| 7,436,966 B2 * | 10/2008 | Prashanth | 380/285 |
| 7,930,756 B1 * | 4/2011 | Crocker et al. | 726/27 |
| 2004/0039918 A1 * | 2/2004 | Prashanth | 713/180 |
| 2007/0113224 A1 | 5/2007 | Bourdon et al. | |
| 2007/0113230 A1 | 5/2007 | Bourdon et al. | |
| 2007/0245141 A1 | 10/2007 | O'Keeffe et al. | |
| 2007/0245413 A1 | 10/2007 | Andolina et al. | |
| 2009/0024827 A1 | 1/2009 | Davis | |
| 2011/0103578 A1 * | 5/2011 | Orlando et al. | 380/28 |

* cited by examiner

*Primary Examiner* — Gilberto Barron, Jr.
*Assistant Examiner* — Jaron K Brunner
(74) *Attorney, Agent, or Firm* — Schmeiser, Olsen & Watts LLP; Lowell W. Gresham; Charlene R. Jacobsen

(57) ABSTRACT

A processing system (60) includes an input interface (62), a first processor (64), a second processor (66), and an output interface (68) arranged in a serial configuration. Each of the input interface (62), first processor (64), second processor (66), and output interface (68) computes a digest (92, 100, 110, and 114) using information, e.g., a unique parameter (94, 102, 112, 118), known only by that element (62, 64, 66, 68) and using information generated by that element (62, 64, 66, 68). The digests (92, 100, 110, and 114) are used to validate the integrity of payload data (86) processed by the system (60) to form processed data (104) and the system (60) only outputs the processed data (104) upon validation of data integrity. The serial configuration of system (60) may be implemented to provide high bit rate, redundant cryptographic services.

20 Claims, 5 Drawing Sheets

PRIOR ART

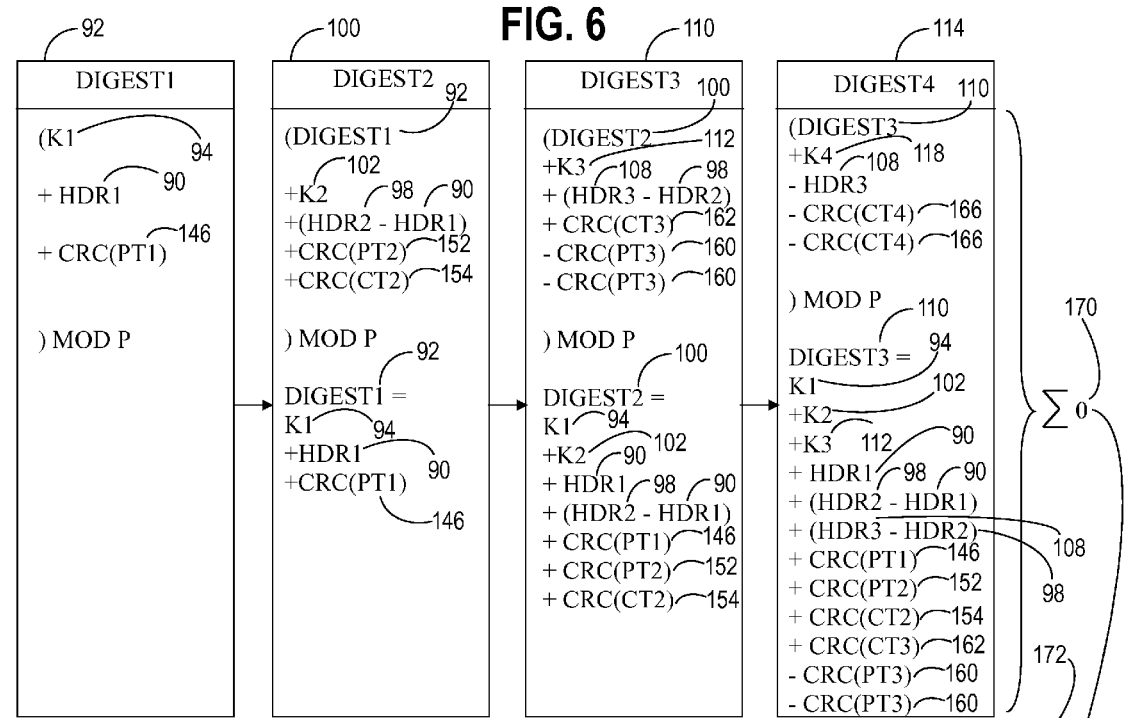

SERIAL ARCHITECTURE FOR HIGH ASSURANCE PROCESSING

TECHNICAL FIELD OF THE INVENTION

The present invention relates generally to high assurance processing systems. More specifically, the present invention relates to a serial architecture for high assurance cryptographic processing.

BACKGROUND OF THE INVENTION

Many situations call for system processing in which there is high assurance that actions presenting an unacceptable risk to secure and/or safe operation are not induced by hardware or software faults and/or malicious attack. For example, high assurance processing systems having security, data integrity, and safety requirements are commonly required in many applications, such as cryptographic systems, aircraft navigation and flight control systems, safety or medical operations, and so forth. In existing technology, high assurance systems are often implemented using techniques of physical redundancy to assure proper operation. While effective, physically replicating complex system elements is often times expensive in terms of hardware, complexity, power, and cost.

FIG. 1 shows a block diagram of a prior art processing system 20 that employs a parallel architecture configuration of elements for providing high assurance processing of payload data. In an example, processing system 20 may be a cryptographic system that provides redundant cryptographic services through the parallel processing architecture.

System 20 includes an input interface 22, an output interface 24, and at least two processors 26 and 28 interposed between input interface 22 and output interface 24. As shown, input interface 22 may have an input port 30 and at least two output ports 32 and 34. Output port 32 is connected to an input 36 of processor 26, and output port 34 is connected to an input 38 of processor 28. Likewise, output interface 24 may have at least two input ports 40 and 42 and an output port 44. An output 46 of processor 26 is connected to input port 40 and an output 48 of processor 28 is connected to input port 42.

In the exemplary illustration, payload data, in the form of a plain text (PT) data packet 50, may be received at input port 30 of input interface 22. Input interface 22 sends PT data packet 50 in an internal message 52 to each of processors 26 and 28. Each of the processors 26 and 28 processes PT data packet 50 contained in the received internal message 52 to produce processed payload data, in the form of a cipher text (CT) data packet 54. Each of processors 26 and 28 outputs CT data packet 54 in an internal message 56 to output interface 24. Output interface 24 compares CT data packet 54 received in each of internal messages 56, and if they match, output interface 24 releases the processed data packet, i.e., CT data packet 54.

While conventional parallel architecture designs, such as system 20, may meet the stringent requirements of high assurance processing, they often do so with severe restrictions on processor input/output speed, or they require specialized processing modules. Furthermore, the multiple input/output ports required for each of input and output interfaces 22 and 24 can have undesirably high power consumption requirements.

In parallel processing architectures, such as system 20, processors 26 and 28 must operate in synchronization. To assure they operate in synchronization, processors 26 and 28 may be run in lockstep fashion such that they perform their execution in unison. Should one processor vary its operation from the other, the comparison function performed at output interface 24 would find the problem. For high speed systems (such as those operating at multi-gigabit per second speeds), synchronizing the streams requires meticulous design with buffering being part of the solution, thereby further increasing the cost and complexity of such a parallel architecture processing system.

Parallel architecture processing systems can also suffer from problems related to signal integrity. Signal integrity is a measure of the quality of an electrical signal. In digital electronics, a stream of binary values is typically represented by a voltage, or current, waveform. Over short distances and at low bit rates, a channel or conductor can transmit this with acceptable reliability. However, at high bit rates (e.g., multi-gigabit per second) and over longer distances, various effects can degrade the signal to the point where errors occur, products fail to operate, or products become unreliable. The high interconnect density of a parallel architecture, such as system 20, the demand for smaller physical size of integrated circuits, and the higher transmission rates have exacerbated noise problems resulting in decreased signal integrity.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 6 shows a chart representing the calculation of successive unique digests derived at each of the elements within the processing system of FIG. 5 in accordance with the redundant processing method of FIG. 4.

DETAILED DESCRIPTION

Embodiments of the invention entail a method and system for high assurance processing of payload data. The method and system employ a serial configuration of processing elements. Each element in the system computes a digest, also known as a hash, hash value, or message digest. The computed digest provides a unique "fingerprint" at each element in the system so that any change in the data, either accidental or malicious, results in a different digest, i.e., fingerprint, than that which is intended. Accordingly, the digest provides services including integrity over header and payload data, and validation that the processing elements correctly operated on the payload data. The serial configuration of the processing system enables a dual high-speed interface for the elements within the system for achieving lower power consumption, scalability for high speed data rates using currently available and upcoming processors, simpler signal integrity design, and relatively low cost. Furthermore, the serial configuration of the processing system and implementation of digests enables high assurance redundant processing without incurring the cost and complexity of running in lockstep fashion in order to synchronize data streams.

In an embodiment, the method and system are described in connection with performing redundant cryptographic services. However, in alternative embodiments, the method and system may perform redundant processing in other high assurance applications such as, in aircraft navigation and flight control systems, safety or medical operations, and so forth. In still other embodiments, digests may be implemented when spreading a single operation among multiple elements (e.g., encryption in a first processor and authentication in a second processor) to validate that the processing elements operated correctly on the payload data.

Figure 1:
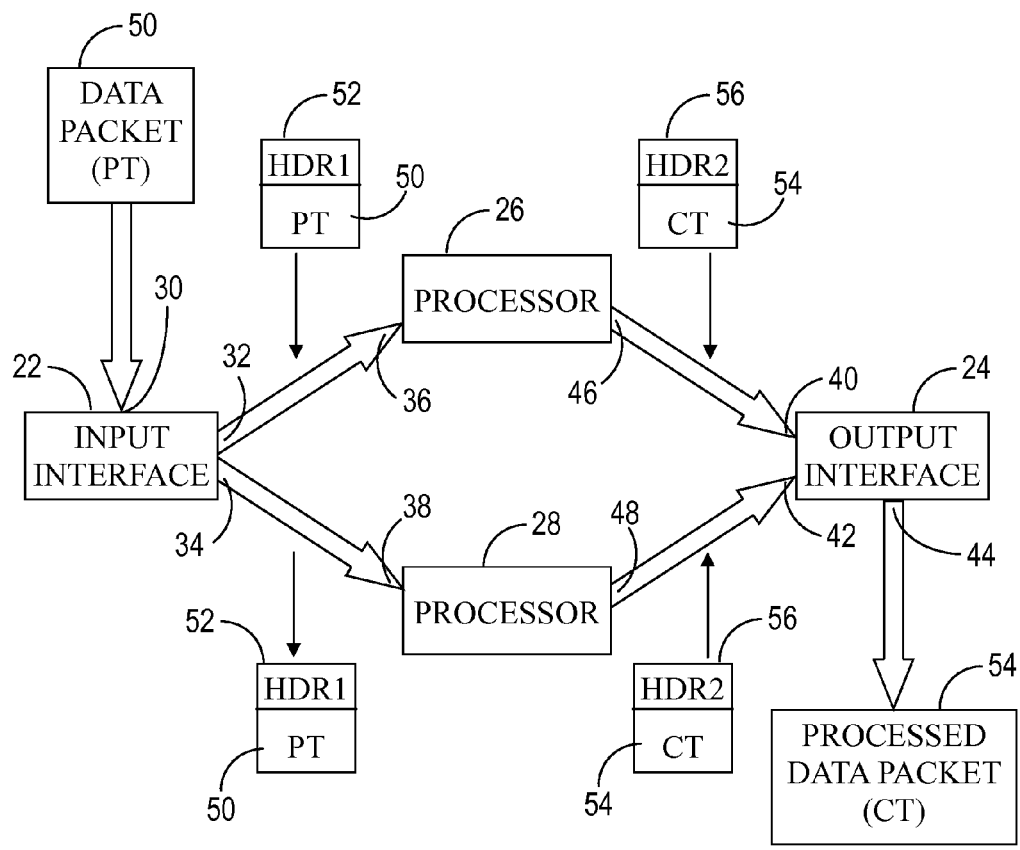
FIG. 1 shows a block diagram of a prior art processing system that employs a parallel architecture configuration of elements for providing high assurance processing of payload data.
Figure 2:
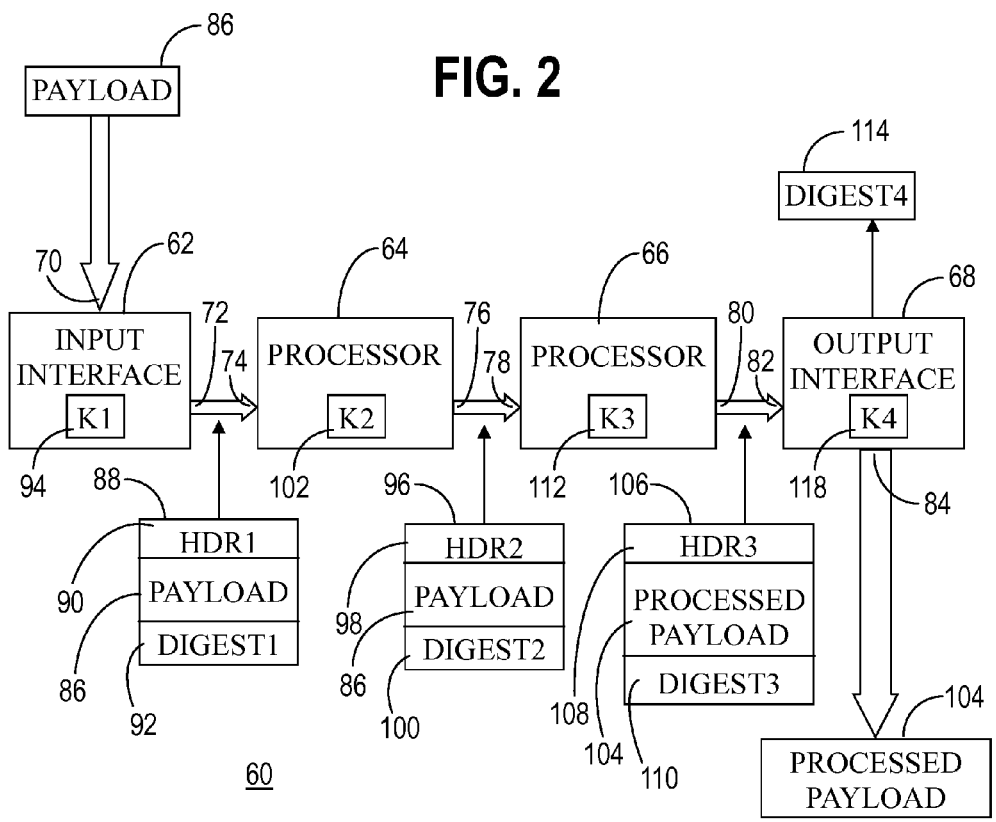
FIG. 2 shows a block diagram of a processing system that employs a serial architecture configuration of elements for providing high assurance processing of payload data in accordance with an embodiment of the invention.

FIG. 2 shows a block diagram of a processing system 60 that employs a serial architecture configuration of elements for providing high assurance processing of payload data in accordance with an embodiment of the invention. System 60 includes an input interface 62, a first processor 64, a second processor 66, and an output interface 68. Input interface 62 includes a first input 70 and a first output 72. Likewise, first processor 64 includes a second input 74 and a second output 76, second processor 66 includes a third input 78 and a third output 80, and output interface 68 includes a fourth input 82 and a fourth output 84. First output 72 is in communication with second input 74. Second output 76 is in communication with third input 78, and third output 80 is in communication with fourth input 82. The inputs and outputs described above refer to the hardware ports and software that link one element with another for each of input interface 62, first processor 64, second processor 66, and output interface 68 in processing system 60.

In general, input interface 62 is configured to receive payload data 86 at first input 70 and generate an outgoing message, referred to herein as a first message 88. First message 88 includes a first header 90, payload data 86, and an output digest, referred to herein as a first digest 92. First digest 92 is derived from payload data 86, first header 90, and a first parameter 94 unique to and known only by input interface 62 within system 60. The computation of first digest 92 will be discussed in greater detail below in connection with a particular example presented in FIGS. 4-6.

First message 88 is output from input interface 62 at output 72 and is communicated to first processor 64 where it is received at second input 74 as an incoming message. First processor 64 processes payload data 86 contained in first message 88 to produce first processed payload data (not shown). In addition, first processor 64 generates an outgoing message, referred to herein as a second message 96. Second message 96 includes a second header 98, payload data 86, and an output digest, referred to herein as a second digest 100. Second digest 100 is derived from first digest 92, payload data 86, the processed payload data, second header 98, and a second parameter 102 unique to and known only by first processor 64 within system 60. The computation of second digest 100 will also be discussed in greater detail below in connection with the particular example presented in FIGS. 4-6.

Second message 96 is output from first processor 64 at output 76 and is communicated to second processor 66 where it is received at third input 78 as an incoming message. Second processor 66 processes payload data 86 contained in second message 96 to produce second processed payload data 104. In addition, second processor 66 generates an outgoing message, referred to herein as a third message 106. Third message 106 includes a third header 108, second processed payload data 104, and an output digest, referred to herein as a third digest 110. Third digest 110 is derived from second digest 100, payload data 86, second processed payload data 104, third header 108, and a third parameter 112 unique to and known only by second processor 66 within system 60. The computation of third digest 110 will also be discussed in greater detail below in connection with the particular example presented in FIGS. 4-6.

Third message 106 is output from second processor 66 at third output 80 and is communicated to output interface 68 where it is received at fourth input 82 as an incoming message. Output interface 68 derives a validation digest, referred to herein as a fourth digest 114 from third digest 110, second processed payload data 104, third header 108, and a fourth parameter 118 unique to and known only by output interface 68 within system 60. Output interface 68 then determines whether fourth digest 114 matches a predetermined value (discussed below).

As will be discussed in greater detail, a match between the derived fourth digest 114 and the predetermined value at output interface 68 validates that each of input interface 62, first processor 64, second processor 66, and output interface 68 operated correctly on payload data 86 to yield second processed payload data 104. In the redundant processing configuration of system 60, a match between fourth digest 114 and the predetermined value at output interface 68 further validates that the first processed payload data (not shown) produced at first processor 64 is identical to second processed payload data 104 produced at second processor 66. Accordingly, fourth digest 114 may be considered a validation digest since it is used to validate the processing occurring in system 60.

When there is a match between fourth digest 114 and the predetermined value, output interface 68 releases, i.e., outputs, second processed payload data 104 at output 84. Alternatively, when there is not a match between fourth digest 114 and the predetermined value, output interface 68 will not release second processed payload data 104 since it may have been accidentally or unintentionally compromised, or otherwise inappropriately processed. Again, the computation of fourth digest 114 will be discussed in greater detail below in connection with the particular example presented in FIGS. 4-6.

Figure 3:
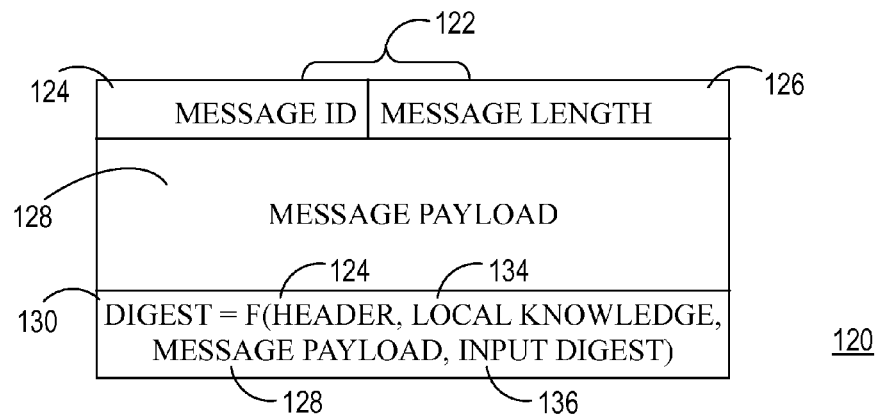
FIG. 3 shows a block diagram of a message structure for internal messages communicated from various elements of the system of FIG. 2.

Referring to FIG. 3 in connection with FIG. 2, FIG. 3 shows a block diagram of a message structure 120 for internal messages communicated from various elements of processing system 60. The internal messages include first message 88, second message 96, and third message 106 (FIG. 2). Message structure 120 includes a header 122 which may contain a message identifier 124 and a message length identifier 126. Message structure 120 further includes a message payload 128 and a digest 130.

Header 122 defines what the message carried in message structure 120 is about. For example, header 122 can be any of first, second, and third headers 90, 98, and 108 (FIG. 2) of respective first, second, and third messages 88, 96, and 106. Message payload 128 is typically user data or processed user data. For example, message payload 128 can be payload data 86 contained in either of first and second messages 88 and 96 or second processed payload data 104 contained in third message 106. Digest 130 is the unique hash value or fingerprint generated at each element within system 60 that is utilized to provide integrity that the element performed its operations appropriately.

Digest 130 is a value that includes contributions from each of the elements (e.g., input interface 62, first processor 64, second processor 66, and output interface 68) within system 60 that have handled payload data 86. Thus, digest 130 can be a function of header 124, local knowledge 134 (e.g., first parameter 94, second parameter 102, third parameter 112, or fourth parameter 118), message payload 128, and an input digest 136 (i.e., one of digests 92, 100, 110 from an immediately preceding element in the serial architecture of processor system 60, if one was derived). Again, the computation of digest 130 will be discussed below in connection with the particular example presented in FIGS. 4-6.

Figure 4:
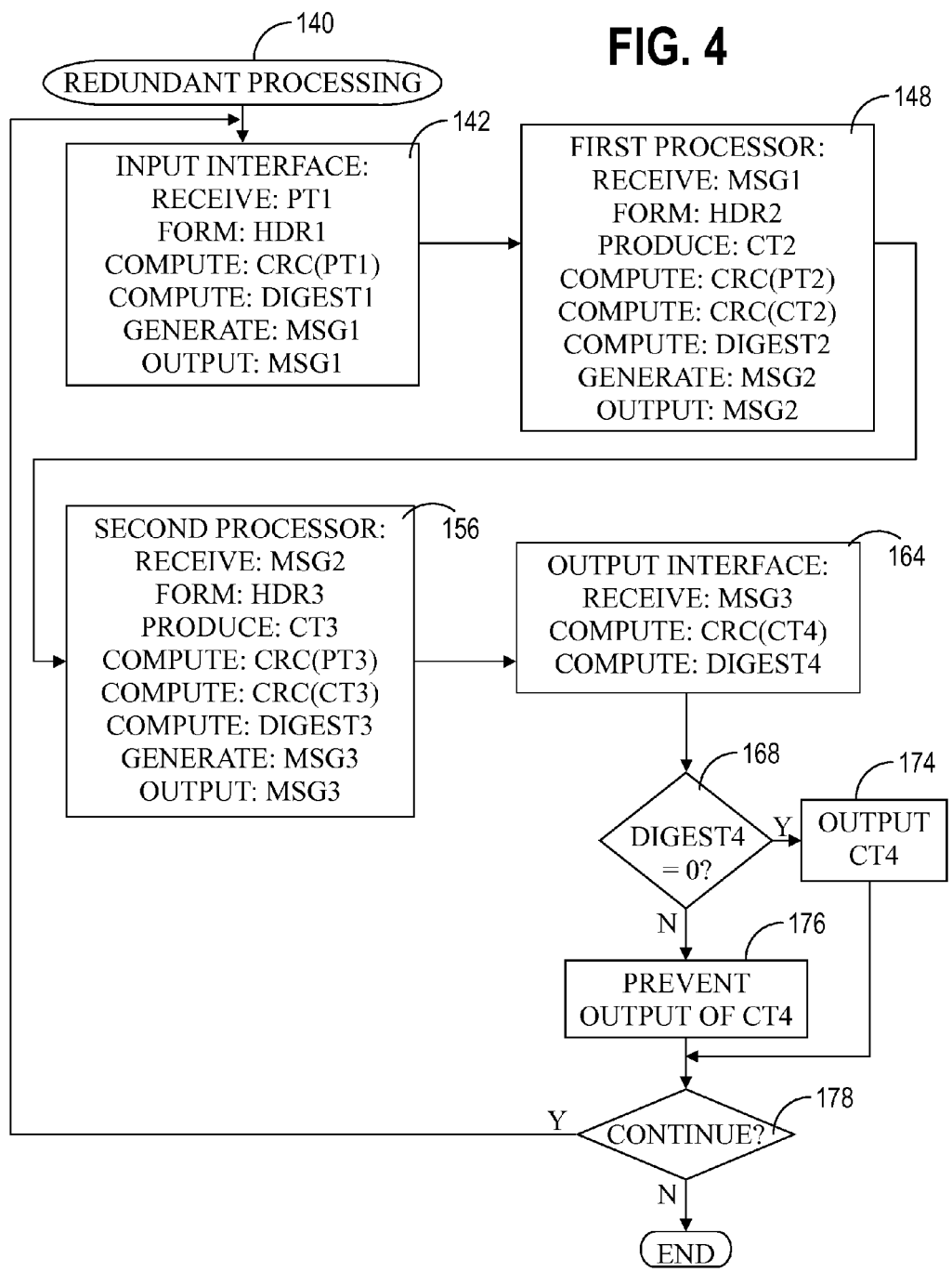
FIG. 4 shows a flowchart of a redundant processing method in accordance with another embodiment of the invention.
Figure 5:
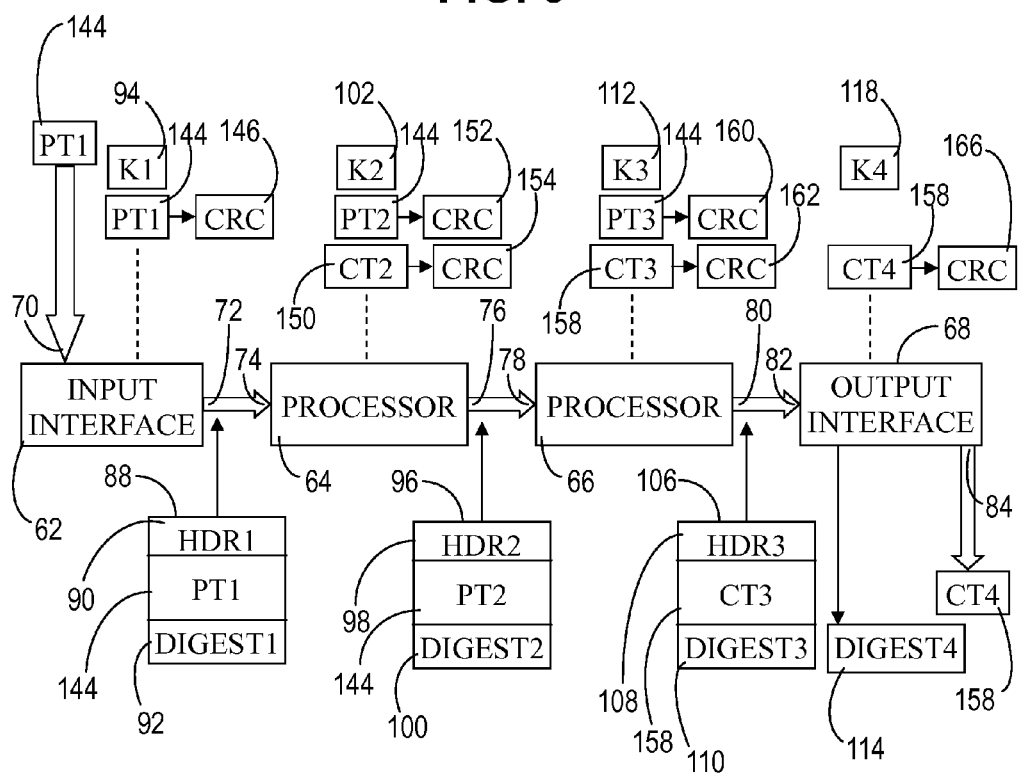
FIG. 5 shows a block diagram of the system of FIG. 2 configured in a particular example to provide cryptographic services.

Referring now to FIGS. 4-6, FIG. 4 shows a flowchart of a redundant processing method 140 that may be performed in accordance with another embodiment. FIG. 5 shows a block diagram of system 60 configured in a particular example to provide cryptographic services, and FIG. 6 shows a chart representing the calculation of successive unique digests derived at each of the elements within processing system 60 in accordance with redundant processing method 140. Since processing system 60 provides cryptographic services in the illustrative embodiment of FIGS. 4-6, processing system 60 will be referred to hereinafter as cryptographic system 60. In addition, first processor 64 will be referred to hereinafter as first cryptographic processor 64 and second processor 66 will be referred to hereinafter as second cryptographic processor 66.

Redundant processing method 140 is executed within the serial architecture of cryptographic system 60 to provide high assurance cryptographic services at high speed (e.g., multi-gigabit per second). As such, cryptographic system 60 and redundant processing method 140 are described in connection with receiving payload data, in the form of plain text, and encrypting it to produce processed payload data, in the form of cipher text. However, it should be understood that cryptographic system 60 and redundant processing method 140 may alternatively receive cipher text and decrypt it to produce plain text. In general, the reference numerals utilized in FIG. 2 are largely repeated in FIG. 5, except for the reference numerals associated with the payload data and processed payload data. Instead, the payload data, e.g., plain text, and the processed payload data, e.g., cipher text, are distinguished by different reference numerals than those used in FIG. 2 to emphasize the particular configuration in which system 60 is implemented for cryptographic processing.

Redundant processing method 140 is discussed herein in connection with an architecture that includes two processing stages, e.g., processors 64 and 66. However, alternative embodiments may be extended to more then two processing stages. For example, multiple processing engines may be utilized when different processors do encryption and authentication.

Redundant processing method 140 begins at a task 142. At task 142, input interface 62 receives plain text 144, labeled PT1, at first input 70. Input interface 62 performs a series of operations in response to receipt of plain text 144. That is, input interface 62 forms first header 90, HDR1, and computes an integrity value 146, CRC(PT1), from plain text 144. In an embodiment, integrity value 146 representing plain text 144 received at input interface 62 may be a short fixed-length binary sequence calculated using, for example, cyclic redundancy check (CRC) code. As known to those skilled in the art, CRC code is a non-secure hash function, or error-detecting code, used to detect changes to data, such as plain text 144.

CRC code is desirable to calculate integrity value 146 because it can be readily implemented in binary hardware, it is straightforward to mathematically analyze, and it is suitable for detecting errors commonly caused by noise in transmission channels. However, the particular means for calculating integrity value 146 is not limited to CRC. Alternatively, integrity value 146 may be calculated using other known error-detecting code, such as bit interleaved parity 32(BIP-32), a checksum algorithm, 32-bit modulo reduction, as well as, upcoming error-detecting code.

Next at task 142, input interface 62 computes first digest 92, labeled DIGEST1, as a function of first header 90, first parameter 94, and integrity value 146 representing plain text 144. This operation is particularly illustrated in FIG. 6 in which first digest 92 is shown as being derived by modular arithmetic, i.e., addition modulo p (MOD P), over first parameter (K1), first header 90 (HDR1), and integrity value 146 (CRC(PT1)) for plain text 144 received at input interface 62.

The addition of numbers can create carries (i.e., transfers of numbers, ciphers, or remainders, to the next unit's column or place before the current column or place) that may be retained in the operation or discarded. The effects of the carries may be retained using modular arithmetic. For example, addition modulo p (a prime number) may be utilized to maximize the error detection capabilities. In another embodiment, modulo $2^n-1$ (non-prime, n-bit number, also known as one's complement) may be implemented. However, with the implementation of modulo $2^n-1$, headers and integrity values may cancel one other in some situations, thus preventing their effects form being observable.

At task 142, input interface 62 then generates first message 88 containing first header 90, plain text 144 (PT1), and first digest 92 in accordance with message structure 120 (FIG. 3). First message 88 is communicated from first output 72 of input interface 62 to second input 74 of first cryptographic processor 64.

Following output of first message 88 from input interface 62, redundant processing method 140 performed within cryptographic system 60 continues with a task 148. At task 148, first cryptographic processor 64 receives first message 88 (MSG1) at second input 74. First cryptographic processor 64 performs a number of operations in response to receipt of first message 88. That is, first cryptographic processor 64 forms second header 98, HDR2, and processor 64 processes plain text 144 contained in the received first message 88. For example, processor 64 encrypts plain text 144, PT2, to produce first processed payload data in the form of cipher text 150, CT2. In addition, first cryptographic processor 64 computes an integrity value 152, CRC(PT2), representing plain text 144, PT2, contained in first message 88 and operated on by first cryptographic processor 64. Processor 64 also computes an integrity value 154, CRC(CT2), representing cipher text 150.

Plain text is identified by reference numeral 144 as the payload data being communicated from input interface 62 to first cryptographic processor 64. However, a label for plain text 144 is changed from "PT1" at input interface 62 (i.e., the first stage of system 60) to "PT2" at first cryptographic processor 64 (the second stage of system 60) in FIG. 5 to indicate that plain text 144, PT2, is what processor 64 receives (i.e., sees) which may or may not differ from plain text 144, PT1. For example, plain text 144, PT2, may differ from plain text 144, PT1, if there are bit errors. This labeling structure will be used in the following discussion to indicate that certain information should be the same if there are no errors (malicious or otherwise).

Next at task 148, first cryptographic processor 64 computes second digest 100, labeled DIGEST2, as a function of the input digest, i.e. first digest 92, second parameter 102, second header 98, integrity value 152 representing plain text 144, and integrity value 154 representing cipher text 150. This operation is particularly illustrated in FIG. 6 in which second digest 100 is shown as being derived by addition modulo p (MOD P) over first digest 92 (DIGEST1), second parameter 102 (K2), second header 98 (HDR2), integrity value 152 (CRC(PT2)) for plain text 144 received at first cryptographic processor 64, and integrity value 154 (CRC(CT2)) for cipher text 150 processed at first cryptographic processor 64. First header 90 (HDR1) is also part of the computation of second digest 100. That is, first cryptographic processor 64 computes a delta header (HDR2-HDR1).

In an embodiment, first cryptographic processor 64 does not have access to first parameter (K1) and integrity value 146 (CRC(PT1)). Rather, first cryptographic processor 64 has access to first digest 92, in which these values are embedded. This feature is further illustrated in FIG. 6 in which first digest 92 is shown in connection with the computation of second digest 100 as being a function of first parameter 94 (K1), first header 90 (HDR1), and integrity value 146 (CRC(PT1)) for plain text 144 received at input interface 62.

At task 148, first cryptographic processor 64 then generates second message 96 containing second header 98, plain text 144 (PT2), and second digest 100 in accordance with message structure 120 (FIG. 3). Second message 96 is communicated from second output 76 of first cryptographic processor 64 to third input 78 of second cryptographic processor 66.

Following output of second message 96 from first cryptographic processor 64, redundant processing method 140 performed within cryptographic system 60 continues with a task 156. At task 156, second cryptographic processor 66 receives second message 96 (MSG2) at third input 78. Second cryptographic processor 66 performs a number of operations in response to receipt of second message 96. That is, second cryptographic processor 66 forms third header 108, HDR3, and processor 66 processes plain text 144 contained in the received second message 96. For example, processor 66 encrypts plain text 144, PT3, to produce second processed payload data in the form of cipher text 158, CT3. In addition, second cryptographic processor 66 computes an integrity value 160, CRC(PT3), representing plain text 144, PT3, contained in second message 96 and operated on by second cryptographic processor 66. Processor 66 also computes an integrity value 162, CRC(CT3), representing cipher text 158.

Again, it should be noted that plain text is identified by reference numeral 144 as the payload data being communicated from input interface 62 to first cryptographic processor 64, and from processor 64 to second cryptographic processor 66. However, the label for plain text 144 is changed from "PT2" at first cryptographic processor 64 (i.e., the second stage of system 60) to "PT3" at second cryptographic processor 66 (i.e., the third stage of system 60) in FIG. 5 to indicate that plain text 144, PT3, is what processor 66 receives (i.e., sees) which may or may not be different from plain text 144, PT2. For example, plain text 144, PT3, may differ from plain text 144, PT2, if there are bit errors (malicious or otherwise).

Next at task 156, second cryptographic processor 66 computes third digest 110, labeled DIGEST3, as a function of the input digest, i.e. second digest 100, third parameter 112, third header 108, integrity value 160 representing plain text 144, and integrity value 162 representing cipher text 158. This operation is particularly illustrated in FIG. 6 in which third digest 110 is shown as being derived by addition modulo p (MOD P) over second digest 100 (DIGEST2), third parameter 112 (K3), third header 108 (HDR3), integrity value 160 (CRC(PT3)) representing plain text 144 received at second cryptographic processor 66, and integrity value 162 (CRC(CT3)) representing cipher text 158 produced at second cryptographic processor. Second header 98 is also part of the computation of third digest 110. That is, second cryptographic processor 66 computes a delta header (HDR3-HDR2).

Second cryptographic processor 66 does not have access to first parameter 94 (K1), second parameter 102 (K2), integrity value 146 (CRC(PT1)), integrity value 152 (CRC(PT2)), and integrity value 154 (CRC(CT2)). Rather, second cryptographic processor 66 has access to second digest 100, in which these values are embedded. This feature is further illustrated in FIG. 6 in which second digest 100 is shown in connection with the computation of third digest 110 as being a function of first parameter 94 (K1), second parameter (K2) 102, first header 90 (HDR1), second header 98 (HDR2), integrity value 146 (CRC(PT1)) for plain text 144 received at input interface 62, integrity value 152 (CRC(PT2)) for plain text 144 received at first cryptographic processor 64, and integrity value 154 (CRC(CT2)) representing cipher text 158 produced at first cryptographic processor 64.

At task 156, second cryptographic processor 66 then generates third message 106 containing third header 108, the processed payload data as cipher text 158 (CT3), and third digest 110 in accordance with message structure 120 (FIG. 3). Third message 106 is communicated from third output 80 of second cryptographic processor 66 to fourth input 82 of output interface 68.

Following output of third message 106 from second cryptographic processor 66, redundant processing method 140 performed within cryptographic system 60 continues with a task 164. At task 164, output interface 68 receives third message 106 (MSG3) at fourth input 82. Output interface 68 performs a validation operation in response to receipt of third message 106. That is, output interface 68 computes an integrity value 166, CRC(CT4), representing cipher text 158 (CT4) received at output interface 68.

Cipher text is identified by reference numeral 158 as the processed payload data being communicated from second cryptographic processor 66 to output interface 68. However, the label for cipher text 158 is changed from "CT3" at second cryptographic processor 66 (i.e., the third stage of system 60) to "CT4" at output interface 68 (i.e., the fourth stage of system 60) in FIG. 5 to indicate that cipher text 158, CT3, is what processor 66 produces which may or may not differ from cipher text 158, CT4, that output interface 68 receives (i.e., sees). For example, cipher text, CT4, may differ from cipher text 158, CT3, if there are bit errors (malicious or otherwise). This labeling structure is used to indicate that certain information should be the same if there are no errors (malicious or otherwise).

Next at task 164, output interface 68 computes fourth digest 114, labeled DIGEST4, as a function of the input digest, i.e. third digest 110, fourth parameter 118, third header 108, and integrity value 166 representing cipher text 158. This operation is particularly illustrated in FIG. 6 in which fourth digest 114 is shown as being derived by addition modulo p (MOD P) over third digest 110 (DIGEST 3), fourth parameter 118 (K4), third header 108 (HDR3), and integrity value 166 (CRC(CT4)) for cipher text 158 received at output interface 68 in third message 106.

Output interface 68 does not have access to first parameter 94 (K1), second parameter 102 (K2), third parameter 112 (K3), integrity value 146 (CRC(PT1)), integrity value 152 (CRC(PT2)), integrity value 154 (CRC(CT2)), integrity value 162 (CRC(CT3), and integrity value 160 (CRC(PT3)). Rather, output interface 68 has access to third digest 110, in which these values are embedded. This feature is further illustrated in FIG. 6 in which third digest 110 is shown in connection with the computation of fourth digest 114 as being a function of first parameter 94 (K1), second parameter (K2) 102, third parameter (K3), first header 90 (HDR1), second header 98 (HDR2), third header 108 (HDR3), integrity value 146 (CRC(PT1)) for plain text 144 received at input interface 62, integrity value 152 (CRC(PT2)) for plain text 144 received at first cryptographic processor 64, integrity value 154 (CRC(CT2)) representing cipher text 158 produced at first cryptographic processor 64, integrity value 160 (CRC(PT3)) for plain text 144 received at second cryptographic processor 64, and integrity value 160 (CRC(CT3)) representing cipher text 158 produced at second cryptographic processor 66. Accordingly, fourth digest 114 includes contributions from each element within cryptographic system 60 that processed the payload data, i.e., input interface 62, first cryptographic processor 64, second cryptographic processor 66, and output interface 68.

Following computation of fourth digest 114 at task 164, redundant processing method 140 continues with a query task 168. Query task 168 is a validation task in which fourth digest 114 must match a predetermined value to provide assurance that each of input interface 62, first processor 64, second processor 66, and output interface 68 operated correctly on the payload data. At query task 168, output interface 68 determines whether fourth digest 114 matches a predetermined value 170. In this example, predetermined value 170 is zero. As shown in a summary block 172 in FIG. 6, certain criteria must be met in order for fourth digest 114 to be zero. That is, particular values within fourth digest 114 must cancel.

It should be recalled that each of parameters 94 (K1), 102 (K2), 112 (K3), and 118 (K4) are unique to and known only by their corresponding input interface 62, first processor 64, second processor 66, and output interface 68 within system 60. Fourth parameter 118 for output interface 68 is a function of first, second, and third parameters 94, 102, and 112. In this example, these parameters 94, 102, 112, and 118 are suitably selected and assigned such that addition of first, second, and third parameters 94, 102, and 112 is to the negative of fourth parameter 118 when the elements of cryptographic system 60 have operated correctly. Accordingly, assurance is at least partially provided when K1+K2+K3+K4=0. Thus, the contribution of the parameters 94, 102, 112, and 118 to the digests would be zero.

Integrity of the headers is validated. In this example, each of headers 90, 98, and 108 may be different. As such, their contribution to fourth digest 114 is verified by chaining subtraction of input header values from the input digests through the delta header operation (discussed above) followed with additions of new header values into the computed digests. This processing begins at first processor 64 and is followed by processing at second processor 66. Output interface 68 validates the contribution of the headers 90, 98, and 108 by subtracting the received header, i.e., third header 108. When each of first processor 64, second processor 66, and output interface 68 have received the correct header value, the contribution of the headers to fourth digest 114 is a unique value (for example, zero in this scenario).

Utilizing the technique discussed above when some of the header values are the same, the visibility of their effects to the final digest, i.e., fourth digest 114, may be limited. Exemplary embodiments includes systems in which first header 90 and second header 98 are the same (both corresponding to plain text data) and systems in which first, second, and third headers 90, 98, and 108 are the same. For these embodiments, first, second, and third headers 90, 98, and 108 may be included in the CRC computations. For example, first header 90 (HDR1) and second header 98 (HDR2) may be included in integrity value 146 (CRC(PT1)), in integrity value 152 (CRC(PT2)), and in integrity value 160 (CRC(PT3)) as an internal representation over plain text 144. Third header 108 may be included in integrity value 154 (CRC(CT2)) as an internal representation, in integrity value 162 (CRC(CT3)), and in integrity value 166 (CRC(CT4)) over cipher text 158. In these embodiments, the computation of the digests, either including or excluding additions and subtractions of headers will reflect the effects of the headers along with the effects of the payloads, i.e., the additions and subtractions of the CRC values will result in a predefined final value for fourth digest 114, (zero in this case) when each of messages 88, 96, and 106 are processed correctly.

Integrity of payload data is assured when the appropriate integrity values are the same. In this example, integrity values 146 and 152 for plain text 144 computed at input interface 62 and first processor 64, respectively, must be equivalent to a first validation integrity value computed at second processor 66. In this example, the first validation integrity value is two times integrity value 160 computed at second processor 66. Thus, the plain text contribution can be nullified or removed, as represented by subtraction, during the computation of third digest 110.

Similarly, integrity value 154 for cipher text 150 computed at first processor 64 and integrity value 162 for cipher text 158 computed at second processor 66 must be equivalent to another validation integrity value for cipher text computed at output interface 68. In this example, this second validation integrity value is two times integrity value 166 computed at output interface 68. Thus, the cipher text contribution can be nullified or removed, as represented by subtraction, during the computation of fourth digest 114.

When output interface 68 determines at query task 168 that fourth digest 114 matches zero, redundant processing method proceeds to a task 174. At task 174, output interface 68 releases, i.e., outputs, cipher text 158. However, if fourth digest 114 does not match zero at query task 168, than process control proceeds to a task 176. At task 176, output interface 68 is prevented from outputting cipher text 158. Output interface 68 will not release cipher text 158 because a non-zero fourth digest 114 indicates that the elements within processing system 60 did not operate correctly on plain text 144 and/or an accidental or malicious error occurred during processing.

Following either of tasks 174 or 176, redundant processing method proceeds to a query task 178 where a determination is made as to whether redundant processing method 140 is to continue execution. When method 140 is to continue, process control loops back to task 142 to receive payload data at input interface 62. However, process control ends when a determination is made at query task 178 that redundant processing method 140 is to be discontinued.

In summary, the present invention teaches of a serial architecture of processing elements and a redundant processing methodology. Each element in the system computes a digest that provides a unique "fingerprint" so that any change in the data, either accidental or malicious, results in a different digest, i.e., fingerprint, than that which is intended. Accordingly, the computation of digests provides services including integrity over header and payload data, and validation that the processing elements correctly operated on the payload data. The serial configuration of the processing system enables a dual high-speed interface for the elements within the system for achieving lower power consumption, scalability for high speed data rates using currently available and upcoming processors, simpler signal integrity design, and relatively low cost. Furthermore, the serial configuration of the processing system and implementation of digests enables high assurance redundant processing at multi-gigabit per second speeds without incurring the cost and complexity of running in lock-step fashion in order to synchronize data streams.

Although the preferred embodiments of the invention have been illustrated and described in detail, it will be readily apparent to those skilled in the art that various modifications may be made therein without departing from the spirit of the invention or from the scope of the appended claims. For example, digests discussed herein can be computed in numerous ways as long as each element within the processing system computes its digest based on the various inputs and based on a unique parameter, i.e., local knowledge, known only by that element.

What is claimed is:

1. A method of processing payload data in a serial arrangement of processors, said serial arrangement of processors including at least a first processor and a final processor, said method comprising:
   at an input interface, computing a first digest using said payload data and a parameter unique to said input interface and generating a first message that includes said payload data and said first digest;
   at each of said processors:
      a) receiving an incoming message;
      b) processing data contained in said incoming message to produce processed data;
      c) computing an output digest using an input digest contained in said incoming message, said processed data, and a parameter unique to said processor; and
      d) generating an outgoing message that includes said output digest and one of said payload data and said processed data, wherein said incoming message received by said first processor comprises said first message such that said input digest for said first processor is said first digest, said incoming message received by each processor following said first processor is said outgoing message generated by an immediately preceding processor such that said input digest is said output digest computed by said immediately preceding processor, and said outgoing message generated by said final processor includes said processed data; and
   at an output interface, receiving said outgoing message from said final processor, computing a validation digest using said output digest contained in said outgoing message, said processed data, and a parameter unique to said output interface, and outputting said processed data when said validation digest matches a predetermined value.

2. A method as claimed in claim 1 further comprising serially arranging said input interface, said processors, and said output interface so that an output port of one of said input interface and said serially arranged processors is coupled with an input port of a successive one of said processors and said output interface.

3. A method as claimed in claim 1 further comprising selecting said parameter unique to said input interface, said parameter unique to said each processor, and said parameter unique to said output interface such that a combination of said parameter unique to said input interface and said parameter unique to said each processor nullifies said parameter unique to said output interface.

4. A method as claimed in claim 1 further comprising assigning said each parameter to respective ones of said input interface, said processors, and said output interface such that said each parameter is known only by said one of said input interface, said processors, and said output interface.

5. A method as claimed in claim 1 further comprising:
   at said input interface, said computing said first digest additionally computes said first digest using a first header appended to said first message;
   at each processor, said computing said digest additionally computes said digest using an output header appended to said outgoing message; and
   at said output interface, said computing said validation digest additionally computes said validation digest using said output header; and
   validating an integrity of each of said headers when said validation digest matches said predetermined value.

6. A method as claimed in claim 1 wherein:
   said processed data produced at said first processor is first processed data, said output digest computed at said first processor is a second digest, said outgoing message generated at said first processor is a second message;
   said processed data produced at said final processor is second processed data, said output digest computed at said final processor is a third digest, said outgoing message generated at said final processor is a third message; and
   said method further comprises:
   at said input interface, computing a first integrity value for said payload data, wherein said computing said first digest incorporates said first integrity value;
   at said first processor, computing a second integrity value for said payload data received in said first message, wherein said computing said second digest incorporates said second integrity value;
   at said final processor, computing a validation integrity value for said payload data received in said second message, wherein said computing said third digest incorporates said validation integrity value; and
   validating communication of said payload data to each of said first and final processors when said validation integrity value nullifies said first and second integrity values.

7. A message as claimed in claim 6 wherein:
   said first integrity value comprises first check code for said payload data received at said input interface;
   said second integrity value comprises second check code for said payload data received at said first processor in said first message; and
   said validation integrity value comprises two instances of third check code for said payload data received at said final processor in said second message.

8. A method as claimed in claim 6 comprising:
   at said first processor, computing a third integrity value for said first processed data, wherein said computing said second digest incorporates said third integrity value;
   at said final processor, computing a fourth integrity value for said second processed data, wherein said computing said third digest incorporates said fourth integrity value;
   at said output interface, computing a second validation integrity value for said second processed data received in said third message, wherein said computing said validation digest incorporates said second validation integrity value; and
   validating an integrity of said first and second processed data when said second validation integrity value nullifies said third and fourth integrity values.

9. A method as claimed in claim 8 wherein:
   said third integrity value comprises fourth check code for said first processed data;
   said fourth integrity value comprises fifth check code for said second processed data; and said second validation integrity value comprises two instances of sixth check code for said second processed data received at said output interface in said third message.

10. A method as claimed in claim 1 further comprising validating redundant processing of said payload data at said first and final processors when said validation digest matches said predetermined value.

11. A method as claimed in claim 1 wherein said payload data is one of plain text and cipher text, said processed data is intended to be the other of said plain text and said cipher text, and said serial arrangement of processors includes at least two cryptographic processors.

12. A system for processing payload data comprising:
an input interface configured to receive said payload data, compute a first digest using said payload data and a first parameter, and generate a first message that includes said payload data and said first digest;
a first processor in communication with said input interface and configured to receive said first message from said input interface, process said payload data contained in said first message to produce first processed data, compute a second digest using said first digest, said first processed data, and a second parameter, and generate a second message that includes said payload data and said second digest;
a second processor in communication with said first processor and configured to receive said second message from said first processor, process said payload data contained in said second message to produce second processed data, compute a third digest using said second digest, said second processed data, and a third parameter, and generate a third message that includes said second processed data and said third digest; and
an output interface in communication with said second processor and configured to receive said third message, compute a validation digest using said third digest, said second processed data contained in said third message, and a fourth parameter, and output said second processed data when said validation digest matches a predetermined value.

13. A system as claimed in claim 12 wherein said payload data is one of plain text and cipher text, each of said first and second processed data is intended to be the other of said plain text and said cipher text, said first processor is a first cryptographic processor, and said second processor is a second cryptographic processor.

14. A system as claimed in claim 13 wherein said first and second cryptographic processors perform redundant cryptographic operations, and said output interface is configured to compare said validation digest to said predetermined value, wherein a match between said validation digest and said predetermined value provides assurance that said first processed data matches said second processed data.

15. A system as claimed in claim 12 wherein:
said input interface is further configured to append a first header to said payload data in said first message and to incorporate said first header in said first digest;
said first processor is further configured to append a second header to said payload data in said second message and to incorporate said second header in said second digest;
said second processor is further configured to append a third header to said second processed data in said third message and to incorporate said third header in said third digest; and
said output interface is further configured to incorporate said third header in said fourth digest, and prevent output of said second processed data when said first, second, and third headers in successive ones of said first, second, third, and validation digests fail to nullify one another.

16. A method of processing payload data comprising:
serially arranging an input interface, a first processor, a second processor, and an output interface so that an output port of one of said input interface, said first processor, and said second processor is coupled with an input port of a successive one of said first processor, said second processor, and said output interface;
at said input interface, computing a first digest using said payload data and a first parameter and generating a first message that includes said payload data and said first digest;
at said first processor, receiving said first message from said input interface, processing said payload data contained in said first message to produce first processed data, computing a second digest using said first digest, said first processed data, and a second parameter, and generating a second message that includes said payload data and said second digest;
at said second processor, receiving said second message from said first processor, processing said payload data contained in said second message to produce second processed data, computing a third digest using said second digest, said second processed data, and a third parameter, and generating a third message that includes said second processed data and said third digest; and
at said output interface, receiving said third message from said second processor, computing a validation digest using said third digest, said second processed data contained in said third message, and a fourth parameter, validating redundant processing of said payload data at said first and second processors when said validation digest matches a predetermined value, and outputting said second processed data when said fourth digest matches said predetermined value.

17. A method as claimed in claim 16 further comprising selecting said first, second, third, and fourth parameters for each of said input interface, said first processor, said second processor, and said output interface such that a combination of said first, second, and third parameters nullifies said fourth parameter when said validation digest matches said predetermined value.

18. A method as claimed in claim 16 further comprising:
at said input interface, said computing said first digest additionally computes said first digest using a first header appended to said first message;
at said first processor, said computing said second digest additionally computes said second digest using a second header appended to said second message;
at said second processor, said computing said third digest additionally computes said third digest using a third header appended to said third message; and
at said output interface, said computing said validation digest additionally computes said validation digest using said third header; and
validating an integrity of each of said first, second, and third headers when said validation digest matches said predetermined value.

19. A method as claimed in claim 16 further comprising:
at said input interface, computing a first integrity value for said payload data, wherein said computing said first digest incorporates said first integrity value;
at said first processor, computing a second integrity value for said payload data received in said first message and computing a third integrity value for said first processed data, wherein said computing said second digest incorporates said second and third integrity values;

at said second processor, computing a first validation integrity value for said payload data received in said second message, computing a fourth integrity value for said second processed data, wherein said computing said third digest incorporates said first validation integrity value and said fourth integrity value;

at said output interface, computing a second validation integrity value for said second processed data received in said third message, wherein said computing said fourth digest incorporates said second validation integrity value;

validating communication of said payload data to each of said first and second processors when said first validation integrity value nullifies said first and second integrity values; and validating an integrity of said first and second processed data when said second validation integrity value nullifies said third and fourth integrity values.

20. A method as claimed in claim 16 wherein said payload data is one of plain text and cipher text, each of said first and second processed data is intended to be the other of said plain text and said cipher text, and each of said first and second processors comprises a cryptographic processor.

* * * * *